US011933070B2

(12) United States Patent
Villa et al.

(10) Patent No.: US 11,933,070 B2
(45) Date of Patent: Mar. 19, 2024

(54) HANDLE ASSEMBLY FOR A DOOR OR WINDOW HAVING A DEFINED THICKNESS, AND A METHOD FOR INSTALLING SUCH HANDLE ASSEMBLY

(71) Applicants: Marco Villa, Anzano del Parco (IT); Danilo Ferremi, Agnosine (IT)

(72) Inventors: Marco Villa, Anzano del Parco (IT); Danilo Ferremi, Agnosine (IT)

( * ) Notice: Subject to any disclaimer, the term of this patent is extended or adjusted under 35 U.S.C. 154(b) by 81 days.

(21) Appl. No.: 16/649,221

(22) PCT Filed: Sep. 11, 2018

(86) PCT No.: PCT/IB2018/056919
§ 371 (c)(1),
(2) Date: Mar. 20, 2020

(87) PCT Pub. No.: WO2019/064102
PCT Pub. Date: Apr. 4, 2019

(65) Prior Publication Data
US 2020/0299992 A1 Sep. 24, 2020

(30) Foreign Application Priority Data
Sep. 28, 2017 (IT) ........................ 102017000108924

(51) Int. Cl.
*E05B 3/04* (2006.01)
*E05B 1/00* (2006.01)
(Continued)

(52) U.S. Cl.
CPC ................ *E05B 3/04* (2013.01); *E05B 1/003* (2013.01); *E05B 9/082* (2013.01);
(Continued)

(58) Field of Classification Search
CPC .......... E05B 1/00; E05B 1/0007; E05B 1/003; E05B 3/00; E05B 3/02; E05B 3/04;
(Continued)

(56) References Cited

U.S. PATENT DOCUMENTS 629,123 A * 7/1899 Davis ........................ E05B 3/06 292/356
843,052 A * 2/1907 Weber ........................ E05B 3/04 292/353
(Continued)

FOREIGN PATENT DOCUMENTS

CH 361502 A * 7/1957 ............... E05B 3/04
CN 205382772 U 7/2016
(Continued)

OTHER PUBLICATIONS

Annotated translation of Romero ES 1148208 U (Year: 2015).*
(Continued)

*Primary Examiner* — Christine M Mills
*Assistant Examiner* — Peter H Watson
(74) *Attorney, Agent, or Firm* — CANTOR COLBURN LLP

(57) ABSTRACT

A handle assembly for a door or window comprises a handle and a second element, installable on opposite sides of the door or window, and a pin element rotatable around a pin rotation axis and insertable into the handle or in the second element at variable depths. The handle assembly further comprises a friction reducing group positioned coaxially to the pin element and positionable between the handle and the door or window in the axial direction of the pin rotation axis. Clamping devices constrain the handle and/or the second element on the pin element at adjustable distances along the axial direction according to the thickness of the door or window, so that when the handle assembly is installed on the
(Continued)

door or window, an axial clamping pressure of the handle and of the second element is maintained on the respective side of the door or window. An installation method of the handle assembly on the door or window is also provided.

14 Claims, 10 Drawing Sheets

(51) Int. Cl.

| | |
|---|---|
| ***E05B 9/08*** | (2006.01) |
| ***E05B 15/00*** | (2006.01) |
| ***E05B 15/04*** | (2006.01) |
| ***E05B 17/00*** | (2006.01) |
| ***E05B 63/00*** | (2006.01) |

(52) U.S. Cl.

CPC .......... *E05B 15/0033* (2013.01); *E05B 15/04* (2013.01); *E05B 17/007* (2013.01); *E05B 63/006* (2013.01); *E05Y 2201/628* (2013.01); *E05Y 2201/682* (2013.01); *E05Y 2600/46* (2013.01); *E05Y 2600/502* (2013.01); *E05Y 2600/61* (2013.01); *E05Y 2600/632* (2013.01); *E05Y 2900/132* (2013.01); *E05Y 2900/148* (2013.01)

(58) Field of Classification Search

CPC ...... E05B 15/0033; E05B 17/007; E05B 9/08; E05B 9/082; E05B 63/006; Y10T 292/57; Y10T 292/59; Y10T 292/82; Y10T 292/85; Y10T 292/854; Y10T 292/858; Y10T 292/865; Y10T 292/869; Y10T 292/876; Y10T 292/88; Y10T 292/93; Y10T 292/96; Y10S 292/53; Y10S 292/60

See application file for complete search history.

(56) References Cited

U.S. PATENT DOCUMENTS

| | | | | | |
|---|---|---|---|---|---|
| 2,699,353 | A * | 1/1955 | Nagy | E05B 1/00 | 292/336.3 |
| 4,699,527 | A * | 10/1987 | Hutzel | F16C 19/163 | 384/510 |
| 8,544,903 | B1 * | 10/2013 | Shamp | E05B 9/082 | 292/336.3 |
| 2006/0137143 | A1 | 6/2006 | Wu | | |
| 2013/0015672 | A1 * | 1/2013 | Nadgouda | E05B 13/005 | 292/224 |
| 2014/0159392 | A1 | 6/2014 | Tsai et al. | | |

FOREIGN PATENT DOCUMENTS

| | | | | |
|---|---|---|---|---|
| EP | 1882798 | A1 | 1/2008 | |
| EP | 2087190 | A2 | 8/2009 | |
| EP | 2562330 | A1 * | 2/2013 | E05B 15/02 |
| EP | 3205794 | A1 * | 8/2017 | E05B 3/00 |
| ES | 1148208 | U * | 12/2015 | E05B 3/04 |
| FR | 1424542 | A | 1/1966 | |
| FR | 2314988 | A * | 6/1975 | E05B 3/04 |
| FR | 2493894 | A * | 5/1982 | E05B 3/02 |
| RU | 2416705 | C2 | 4/2011 | |
| WO | 2017103310 | A1 | 6/2017 | |

OTHER PUBLICATIONS

Machine translation of CH 361502 A (Year: 1957).*

Machine translation of EP-2562330-A1 (Year: 2013).*

International Search Report for International Patent Application No. PCT/IB2018/056919, dated Jan. 2, 2019.

International Preliminary Report on Patentability for International Patent Application No. PCT/IB2018/056919, dated Jan. 2, 2019.

Chinese Office Action for corresponding application 201880063230.9: Report dated Dec. 29, 2020.

* cited by examiner

HANDLE ASSEMBLY FOR A DOOR OR WINDOW HAVING A DEFINED THICKNESS, AND A METHOD FOR INSTALLING SUCH HANDLE ASSEMBLY

CROSS-REFERENCE TO RELATED APPLICATIONS

This application is a U.S. National Phase filing of PCT International Patent Application No. PCT/IB2018/056919, having an international filing date of Sep. 11, 2018, which claims priority to Italian Patent Application No. 102017000108924, filed Sep. 28, 2017 each of which is hereby incorporated by reference in its entirety.

FIELD OF THE INVENTION

The present invention is part of the general field of windows and doors. In particular, the invention concerns a handle assembly for a door or a window, and a method of installing the handle assembly on the door or window.

BACKGROUND OF THE INVENTION

Currently, the handle systems for opening doors consist of a pair of handles, a pair of backplates that may or may not accommodate a return mechanism and a handle framework that has the function of allowing the lock to be manipulated.

Inconveniently, for installing the handles on the door, complex operations must be performed by a specialized technician, and specific tools and equipment must be used. Furthermore, the typical fastening of handle assemblies by means of screws requires considerable installation time.

In addition to requiring personnel with specific skills, the aforesaid installation operations do not allow the integrity of the door or window to be preserved, given that it is at least necessary to drill the holes for fastening the backplates. This may represent a problem when replacing the handle, as the previous holes for installing the handle may not match the holes of the replacement handle.

The need is therefore felt for a handle assembly that may be installed in a simple way, without the use of specific equipment even by non-specialized personnel and at the same time preserving the integrity of the door.

SUMMARY OF THE INVENTION

In accordance with the present invention, the aforesaid objects are achieved by the handle assembly, the door or window assembly and the method of installing the handle assembly on a door or window having the features described below. Preferred embodiments of the invention are also described.

BRIEF DESCRIPTION OF THE DRAWINGS

The features and advantages of the handle assembly, the door or window assembly and the method of installing the handle assembly according to the present invention will be apparent from the description given below, provided by way of non-limiting example, in accordance with the accompanying figures, wherein.

DETAILED DESCRIPTION

Figure 1:
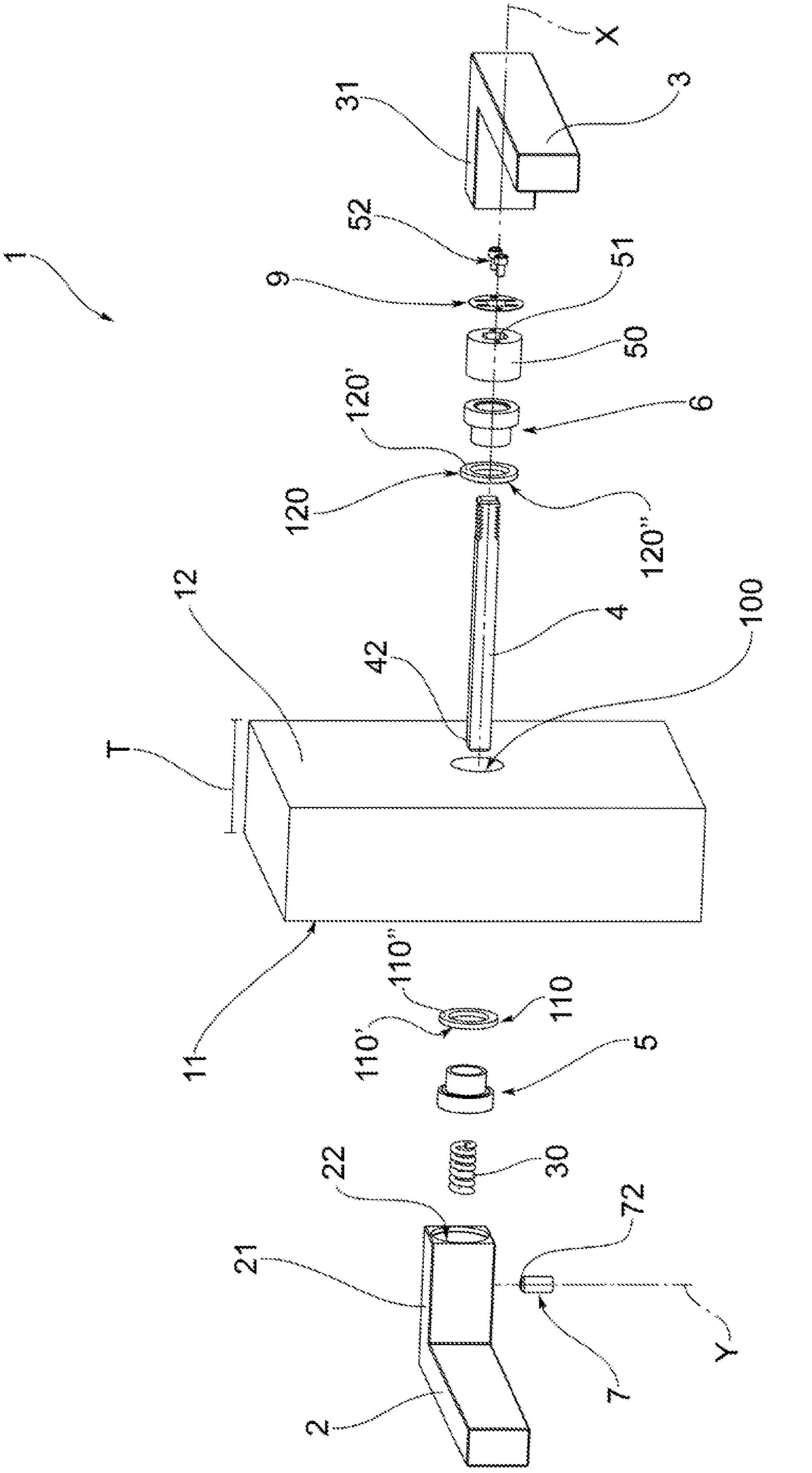
FIG. 1 shows an exploded perspective view of a handle assembly according to an embodiment in accordance with the present invention about a door or window.
Figure 2:
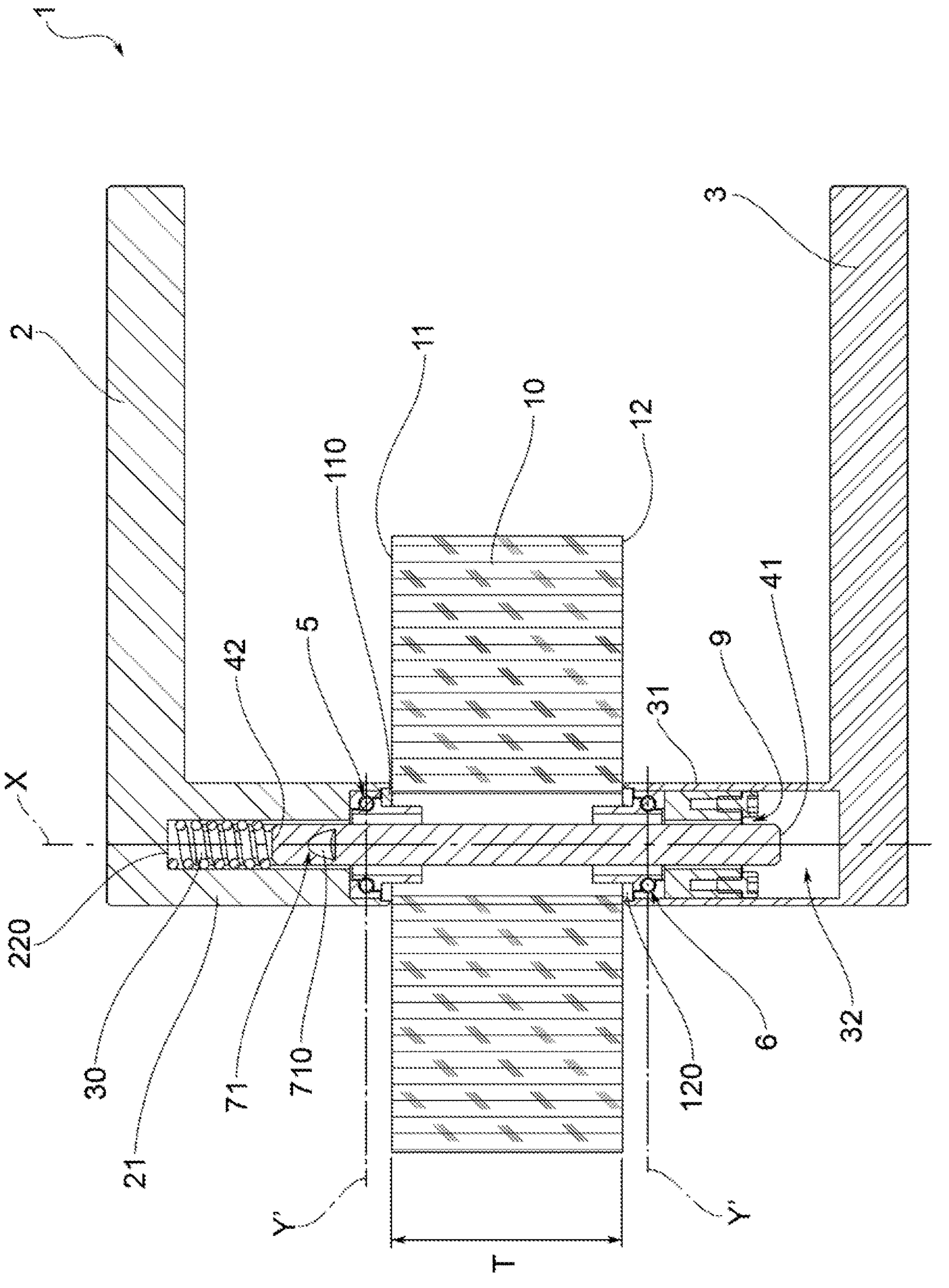
FIG. 2 shows a cross-sectional view of a handle assembly installed on a door or window, in accordance with an embodiment according to the present invention.
Figure 2A:
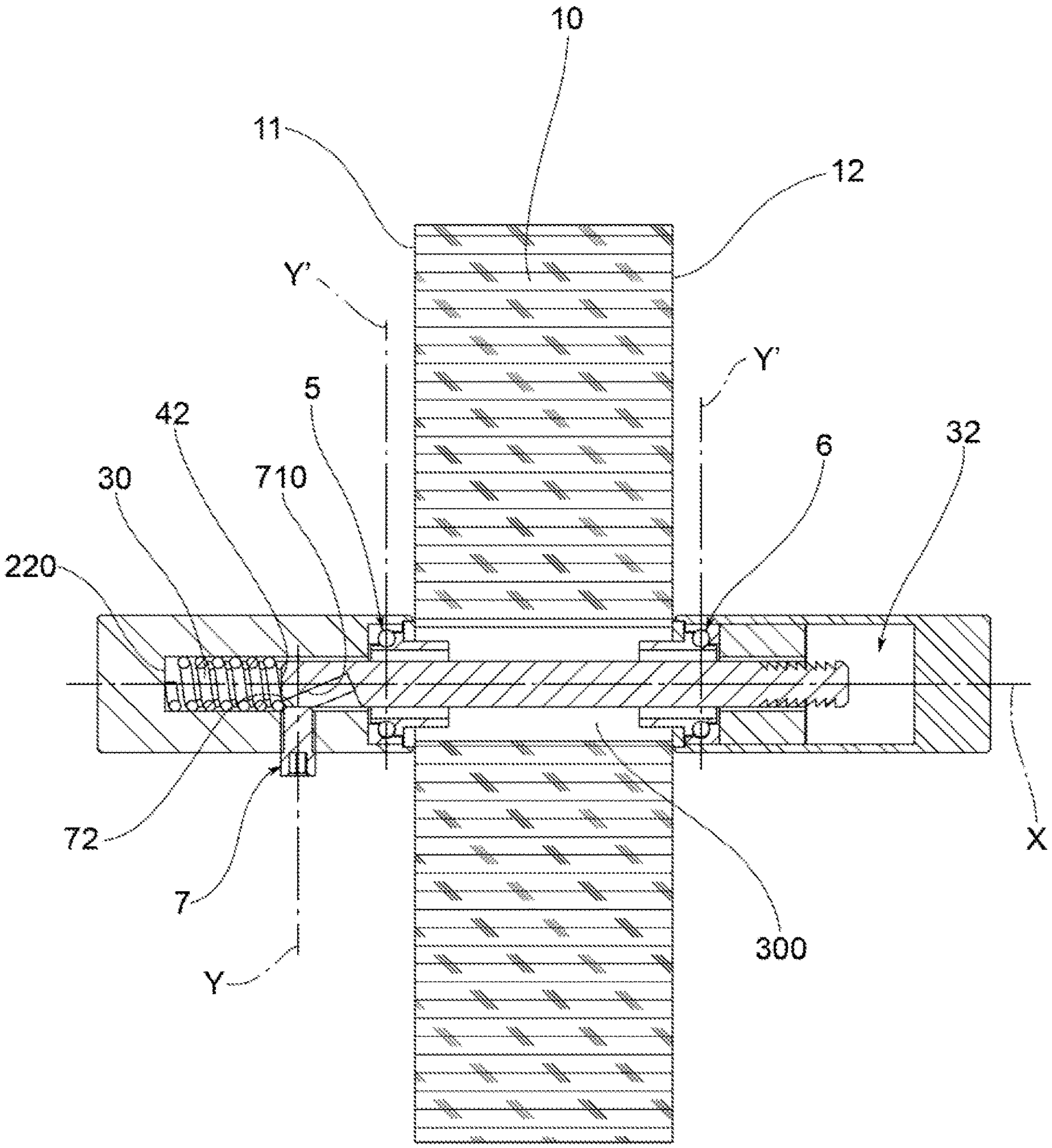
FIG. 2*a* shows a front longitudinal sectional view, perpendicular to the section of FIG. 2, of the handle assembly of FIG. 2.

In the present treatment, reference will be made in general to a door or window 10, understood as any element that may be opened and closed, such as a door, a hatch, a window or the like. However, for the sake of simplicity, the present invention will be described only with reference to its use with a door.

With reference to the accompanying figures, a handle assembly for a door or window 10 having a defined thickness T, such as a door or a window or the like is collectively indicated at 1. The handle assembly 1 comprises a handle 2 suitable to be installed on one side 11 of the door or window 10 and a second element 3, for example a second handle, suitable to be mounted on an opposite side 12 of the door or window 10. The second element 3, in addition to being a second handle, as shown in the accompanying figures, is also any element suitable to close the opening of a hole 100 made in the door or window for the installation of the handle assembly on the opposite side 12, for example without a grip function for opening the door. In the latter case, for example, the handle assembly provides for a single handle 2 that may be used to open the door on one side of the door or window 11.

The handle assembly further comprises a pin element 4 having the main extension along a pin rotation axis X and suitable to penetrate the door or window 10 through the hole 100 made in the door or window 10. The pin element is for example a spindle, known per se in the field of handles, e.g. it is a rod with a cross section that is not a solid of rotation, for example it has a rectangular or square cross section. Such pin element, when the handle assembly is installed on the door or window, creates a rotational interconnection between the handle 2 and the second element 3 and also constitutes a connection between the handle, the second element and a corresponding rotating chamber (not shown) of a lock mechanism arranged in the door or window, rotatable through the rotation of the pin element 4 for opening the door or window.

The pin element 4 comprises a left end 41 and a right end 42, each insertable into the handle 2 or into the second element 3 at a variable depth in the handle 2 or in the second element 3. The pin element 4 is rotatable around the pin rotation axis X under strain applied to the handle 2 by an operator.

The handle assembly 1 also comprises a friction reducing group 5, 6 configured to reduce the friction generated by the rotary movement of the handle 2 (or the second element 3). Such friction reducing group 5, 6 is suitable to be arranged coaxially to the pin element 4 and to be positioned at least between the handle 2 and the door or window 10, as well as between the second element 3 and the door and window 10 (friction reducing group 6), in the axial direction X of the pin rotation axis.

The handle assembly also comprises clamping devices 7, 8, 9, 71, 81, 82 configured to constrain the handle 2 and/or the second element 3 on the pin element 4 at adjustable distances along the axial direction X according to the thickness T of the door or window, so that when the handle assembly 1 is installed on the door or window, an axial clamping pressure of the handle 2 and/or the second element 3 is maintained on the respective side 11 and/or 12 of the door or window 10.

In this way, the handle assembly 1 is kept stable on the door or window and there is no movement of translation of the handle assembly 1 along the axial direction X. Moreover, in this way, the handle assembly 1 preferably has no backplate, known per se in the sector of the handle assemblies, and generally fastened on the door or window by means of fastening screws around the pin element and essential for the functioning of the handles according to the prior art to prevent the translation of the handle assembly along the axial direction.

The friction reducing group is preferably adapted to be subjected to a load by a force along the axial direction X generated as a result of the relative movement along the direction X between the pin element 4 and the handle 2 or the second element 3, in the direction of approach between the handle 2 and the second element 3. The axial strain is exerted on the reducing group by the approaching action between the handle 2 and the second element 3 and operates clamping devices, or, in any case, by a relative translation between the pin element 4 and the handle 2 or second element 3 upon actuation of the clamping devices.

Preferably, such friction reducing group is not fastened to the door or window by fastening means, such as screws, pins, nails, adhesive means or the like, but rather is directly supported by/in the handle 2 or by/in the second element 3 (e.g. by interlocking or fastening/gluing means) or (or in conjunction with) such friction reducing group is maintained in position between the handle 2 and the door or window 10, or between the second element 3 and the door or window 10 by the clamping action along the axial direction X generated as a result of the relative movement along the direction X between the pin element 4 and the handle 2 or the second element 3.

Furthermore, the friction reducing group is suitable to transfer at least partially the force along the axial direction X into a force also in the radial direction Y', perpendicular to the axial direction X. Such feature allows a stable and solid installation of the handle assembly to be obtained.

Preferably, the axial force along the direction X acting between the second element 3 and the door or window 10 or between the handle 2 and the door or window 10 is at least 1000 N, in order to guarantee adequate stability of the handle assembly.

In a particularly advantageous embodiment, the friction reducing group 5, 6 is a bearing, preferably an oblique contact ball bearing. The oblique contact ball bearing enables advantageously for the axial load in the axial direction X to be adequately supported and at the same time for a component of the force to be transmitted along the radial direction Y'. Furthermore, at the same time, due to the ball bearings that guarantee a low friction value (rolling friction), the fluidity required for the rotation movement for opening/closing the door or window by rotating the handle is also guaranteed. In the embodiments shown in the accompanying figures, the handle assembly comprises two friction reducing groups 5, 6, each being a ball bearing, wherein a first bearing is arranged between the handle 2 and the door or window 10 on one side 11 and a second bearing is arranged between the second element 3 and the door or window 10 on the opposite side 12 of the door or window 10.

Preferably, the handle 2 and/or the second element 3 comprise an axial body 21, 31, which extends along a direction perpendicular to the side 11, 12 of the door or window 10 (i.e. a direction parallel to the axial direction X) when the handle assembly 1 is installed on the door or window 10. In such axial body 21, 31 a clamping chamber 22, 32 is made suitable to at least partially accommodate the friction reducing group 5, 6 and the clamping devices 7, 8, 9, 71, 81, 82.

Preferably, the ball chamber containing the balls of the ball bearing is accommodated at least partially or totally in the axial body 21, 31.

According to a preferred embodiment, the clamping devices comprise a first interfering element 7, e.g. a grub screw, suitable to mechanically interfere with the pin element 4. Such interfering element 7 may be actuated by an operator so as to adjust the intensity of the axial pressure of the handle 2 and/or of the second element 3 on the respective side of the door or window 11, 12 when the handle assembly 1 is installed on the door or window 10.

Preferably, the clamping devices comprise at least a first protuberance or a first recess 71 made on the pin element 4, wherein the interfering element 7 is engaged.

For example, the interfering element 7 is a threaded pin, such as a grub screw, movable along a perpendicular direction Y in the axial direction X. Moreover, the recess 71 comprises at least one inclined surface 710 on which engages an end 72 of the threaded pin, so that the movement of the pin along said perpendicular direction Y corresponds to a sliding of the pin on the inclined surface 710 and to a consequent change in the intensity of the clamping pressure.

Preferably, the clamping devices comprise at least a second protuberance or a second recess 82, 83 made on the pin element 4 on the opposite side of the first protuberance or recess 71, i.e. towards the end 41 of the pin element 4 farthest from the first protuberance or recess 71, and a second interfering element, for example a second threaded pin or a fin, with said second protuberance or recess 82, 83.

In one embodiment, the second interfering element is a pin 81 or a retaining plate 9 entirely contained inside the clamping chamber 32 and integrally connected to the handle 2 or to the second element 3 and/or to the friction reducing group 6.

Preferably, the handle assembly 1 comprises an adapter element 50, interposed between the reducing group 6 and the second element 3 in the axial direction X and fastened to the second element 3, so as to be integral therewith. Such adapter element 50 comprises a through-hole 51, suitable to accommodate the pin element 4 and shaped with shapecoupling to the shape of the cross section of the pin element 4. Moreover, preferably, the retention plate 9 is fastened between the adapter element 50 and the second element 3, or directly to the adapter element (for example by means of fastening screws 52).

In a preferred embodiment, the handle assembly 1 comprises an elastic element 30, e.g. a spring, suitable to generate an elastic thrust force in the axial direction X. Such elastic element 30 is preferably contained (completely) in the clamping chamber 22. Advantageously, such elastic element 30 maintains a thrust force of the pin element 4 towards the corresponding second element 3 (or handle) positioned on the opposite side 12 of the door or window relative to the side 11 of the door or window towards which the elastic element 30 is positioned.

Preferably, the handle assembly comprises at least one washer 110, preferably two washers 110, 120, one for each side of the door or window, suitable to engage the friction reducing group 5, 6 on one face 110', 120' thereof, and one side 11, 12 of the door or window on the other face 110", 120", around the hole 100 made in the door or window 10.

In other words, the washer 110, 120 is not fastened to the door or window 10 by fastening means but is held by the axial pressure force along the axial direction X acting between the handle 2 and the door or window 10 and between the second element 3 and the door or window 10.

The washer 110 makes it possible to adapt the handle assembly to any hole size 100 obtained in the door or window.

Obviously, the present invention is also aimed at a door or window assembly, including a door or window 10 on which is installed a handle assembly 1 having all the features described in the previous paragraphs, and, preferably, without a backplate.

Additionally, a method for installing a handle assembly 1 on a door or window 10 is object of the present invention. The method of installation shall be more easily understood in reference to FIGS. 3, 6 and 7, each describing a variant installation of a defined variant of the handle assembly 1.

Figure 3:
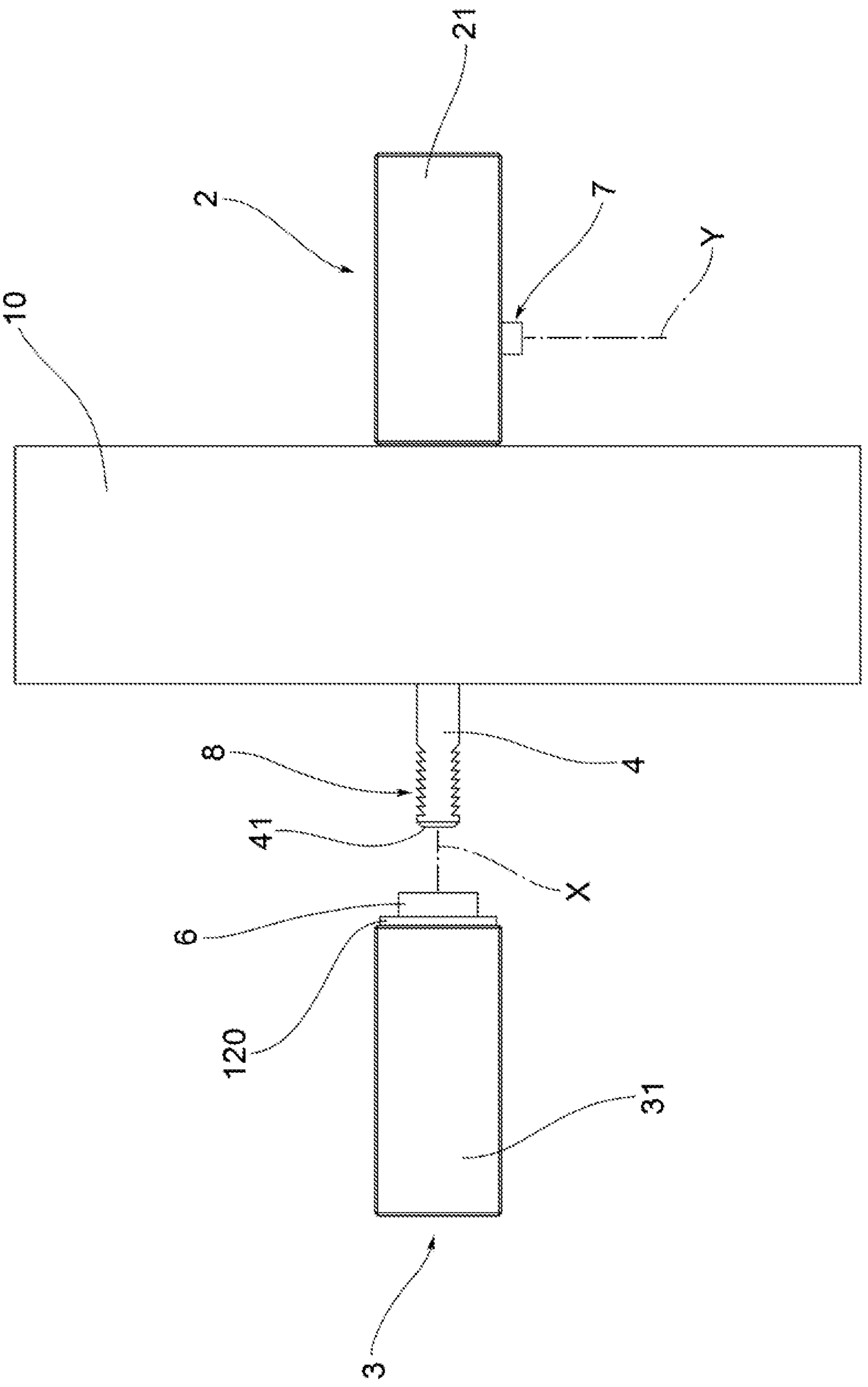
FIG. 3 shows a step in the method of installing a handle assembly according to an embodiment of the present invention.
Figure 4:
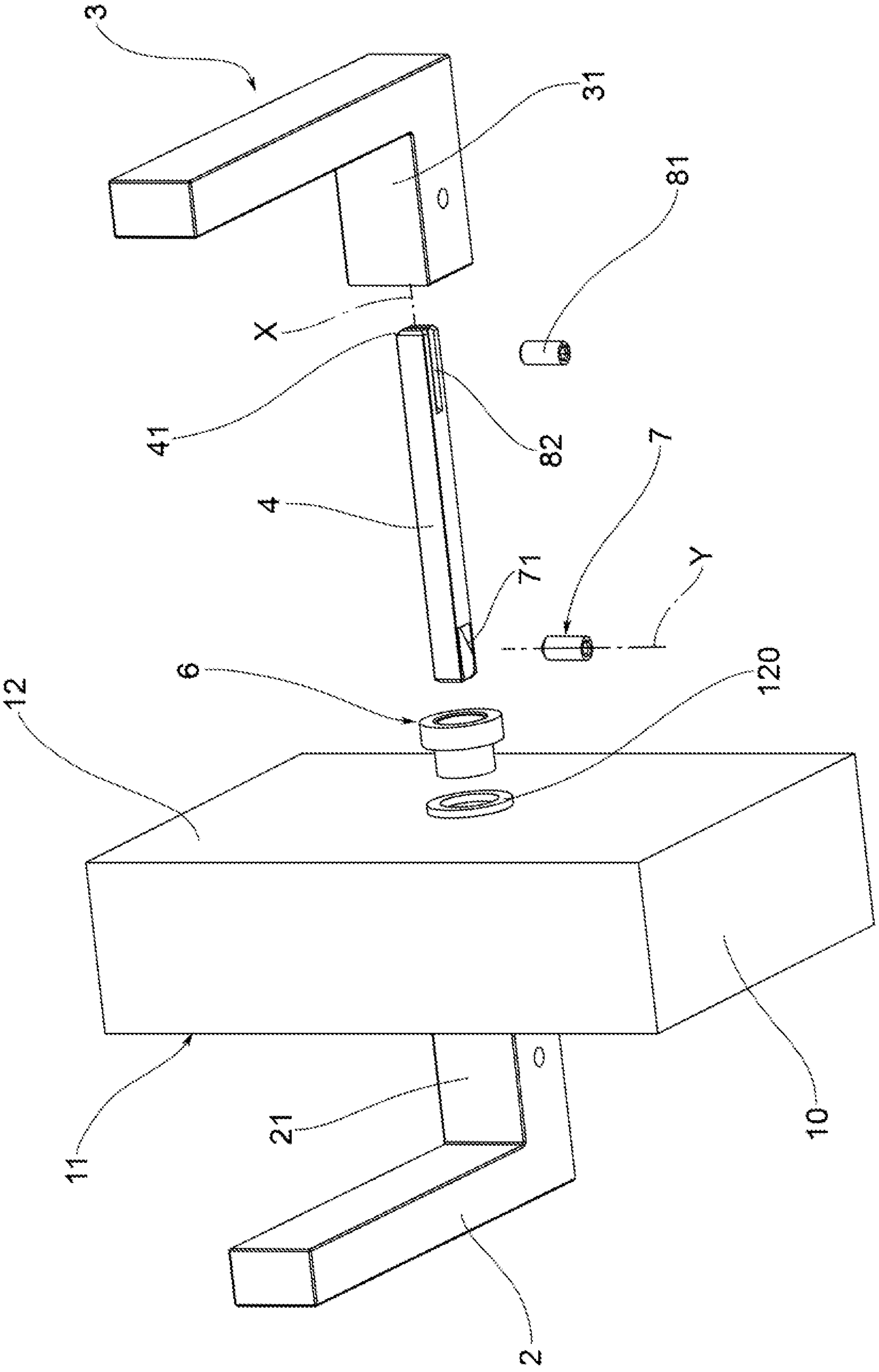
FIG. 4 shows an exploded perspective view of a handle assembly around a door or window, in accordance with a second variant embodiment.
Figure 5:
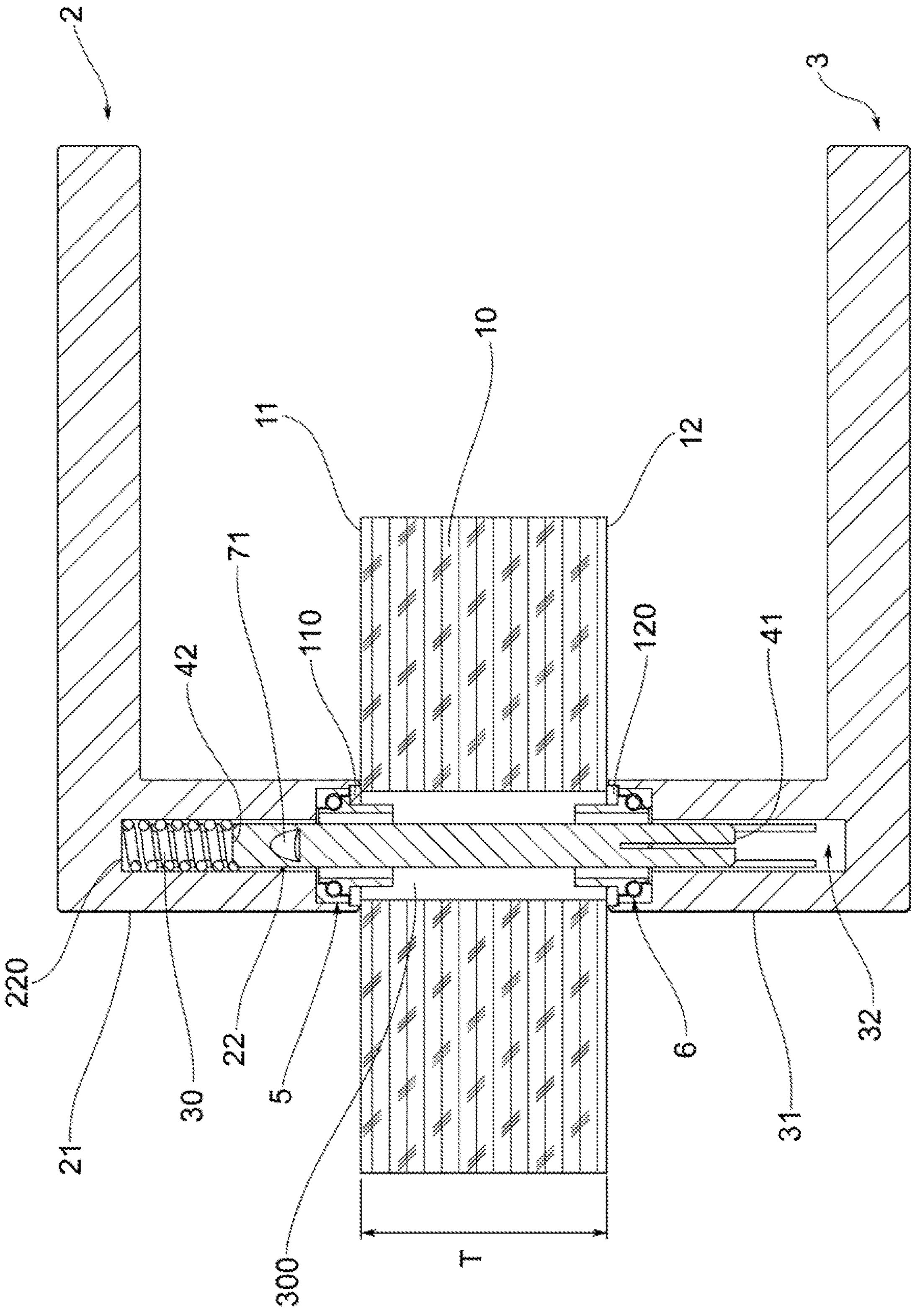
FIG. 5 shows a cross-sectional view of a handle assembly installed on a door or window, in accordance with the second variant embodiment of FIG. 4.
Figure 5A:
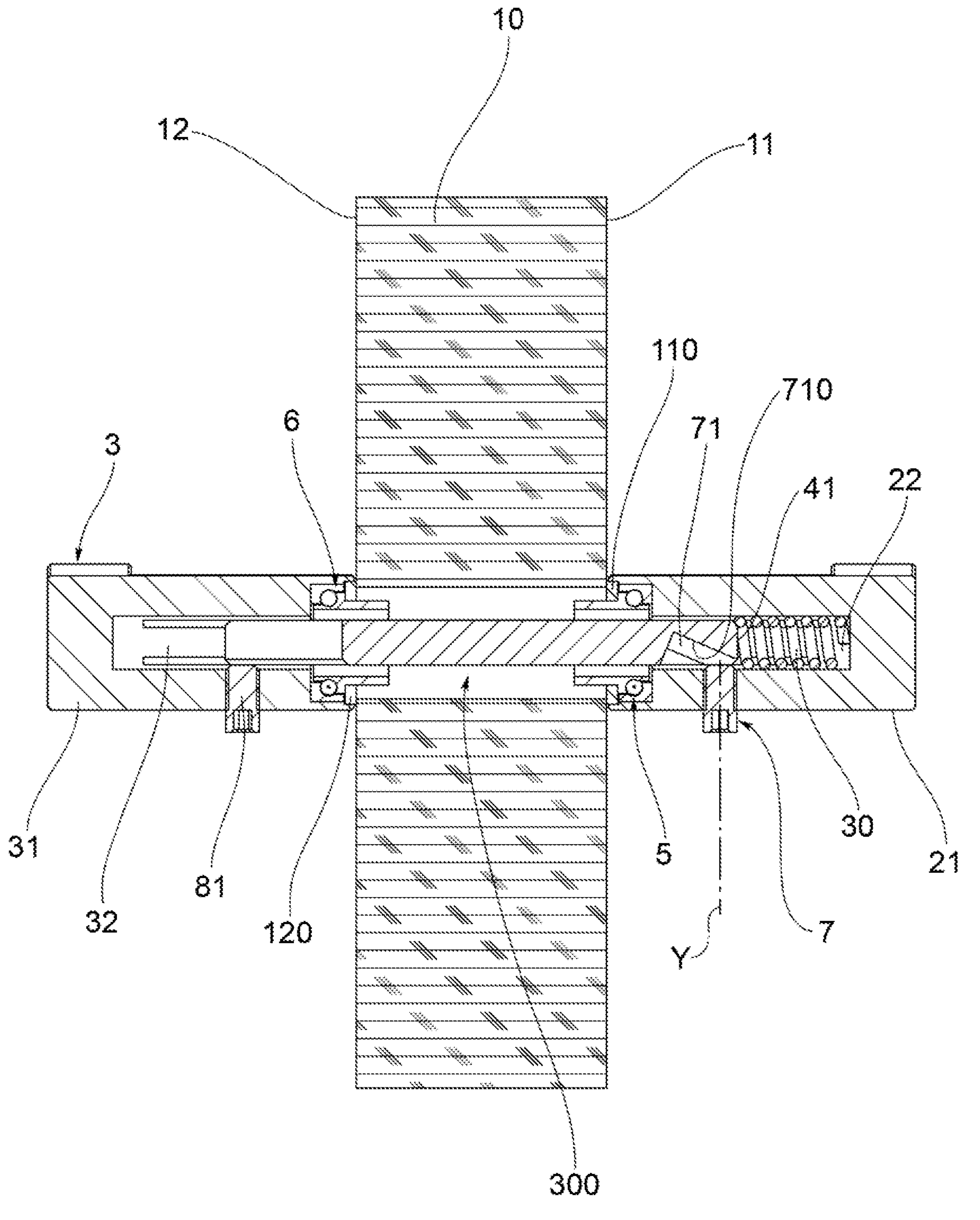
FIG. 5*a* shows a front longitudinal sectional view, perpendicular to the section of FIG. 5, of the handle assembly of FIG. 5.
Figure 6:
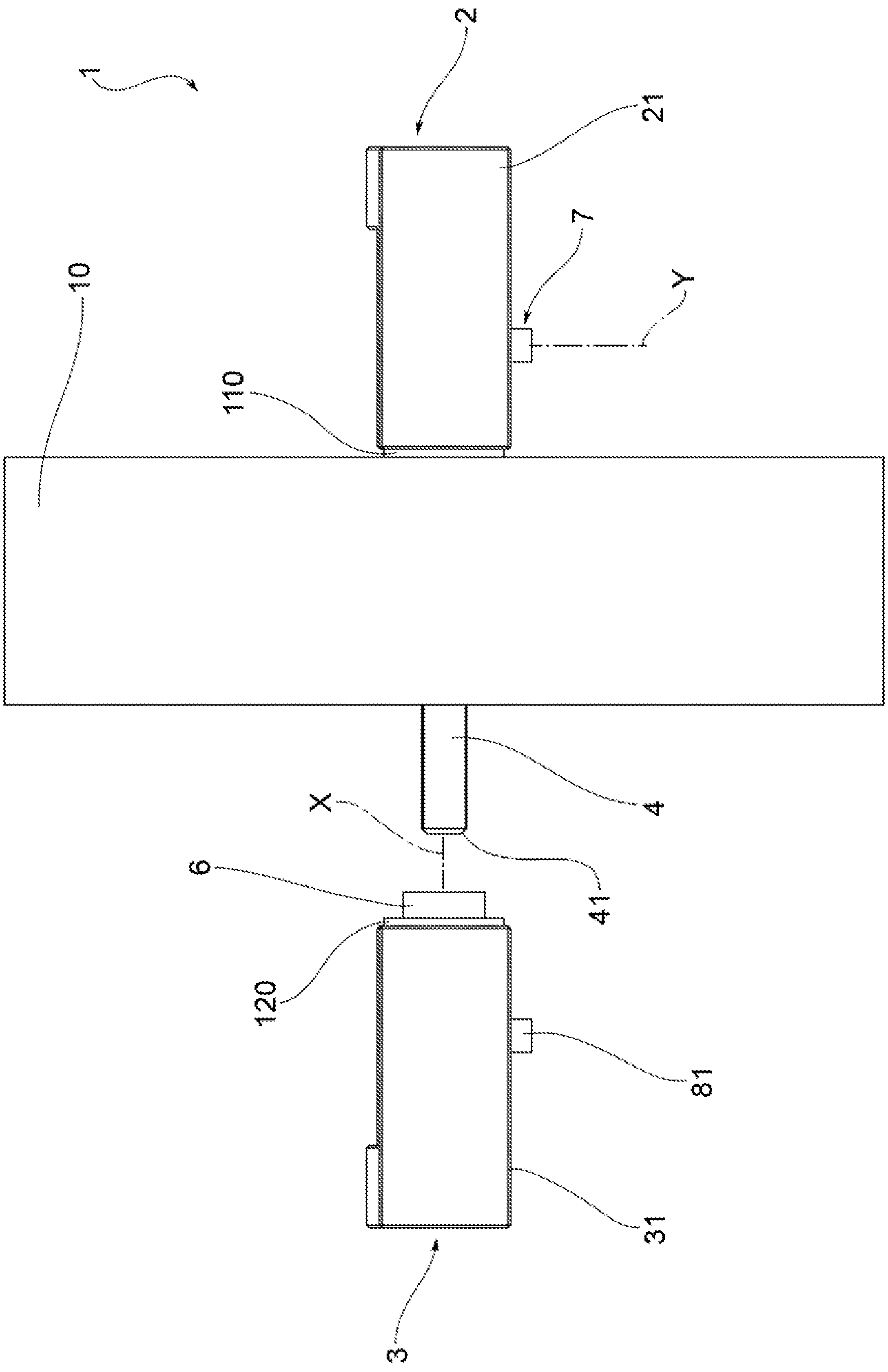
FIG. 6 shows a step in the method of assembling a handle assembly according to the second variant embodiment of the present invention.
Figure 7:
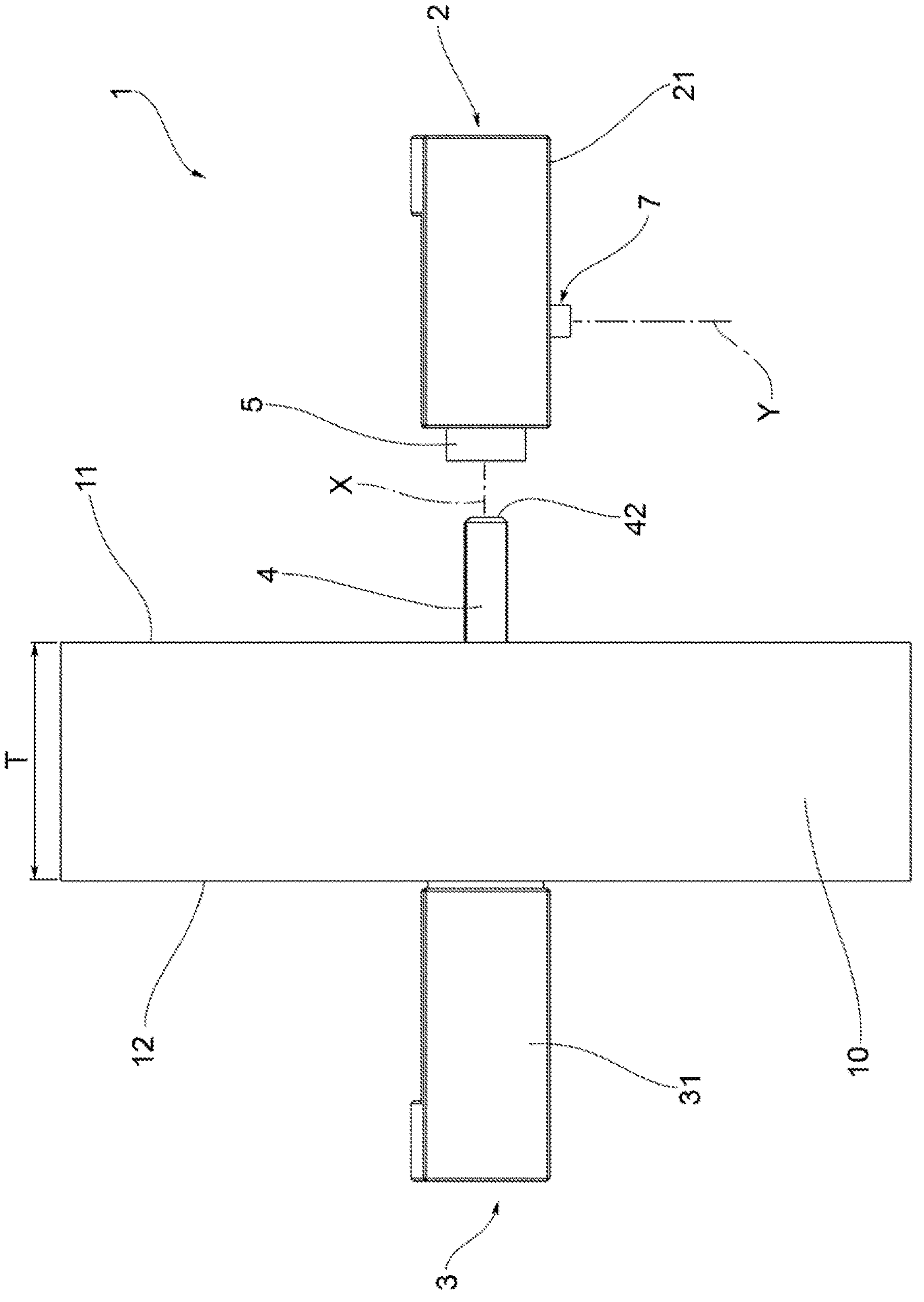
FIG. 7 shows a step in the method of assembling a handle assembly according to another variant embodiment of the present invention.

The method comprises the steps of:

a) providing a handle 2 wherein is inserted a pin element 4 fastened to the handle 2 and protruding from such handle 2 (FIG. 3 or FIG. 6), b) inserting the protruding pin element 4 in a through-hole 100 in the door or window 10 on one side of the door or window 11 (FIGS. 3 and 6);

c) inserting the pin element 4 protruding from the hole 100 on the opposite side 12 of the door or window 10 into a second element 3, e.g. a second handle, performing an axial movement of approach between the handle 2 and the second element 3 until the door or window 10 is encountered;

d) actuating clamping devices 7 to reach a configuration of the handle assembly 1 suitable to maintain an axial pressure (along the axial direction X) of the handle 2 and of the second element 3 on the respective side 11, 12 of the door or window.

Preferably step d) is executed after executing step c).

Preferably, step c) provides for engaging an interfering element 9 with a notched region 8 during the movement of approach until a stable configuration of the interfering element 9 on the notched region 8 is reached. During such step, the elastic element 30 (e.g. a spring) keeps the pin element 4 pushed towards the second element 3, ensuring the progressive sliding of the interfering element 9 on the notched region until the second element 3 reaches the side of the door or window 12 in abutment. Additionally, the elastic element 30 is suitable to maintain the end 42 of the pin element 4 around a position predetermined by a bottom wall 220.

Figure 8:
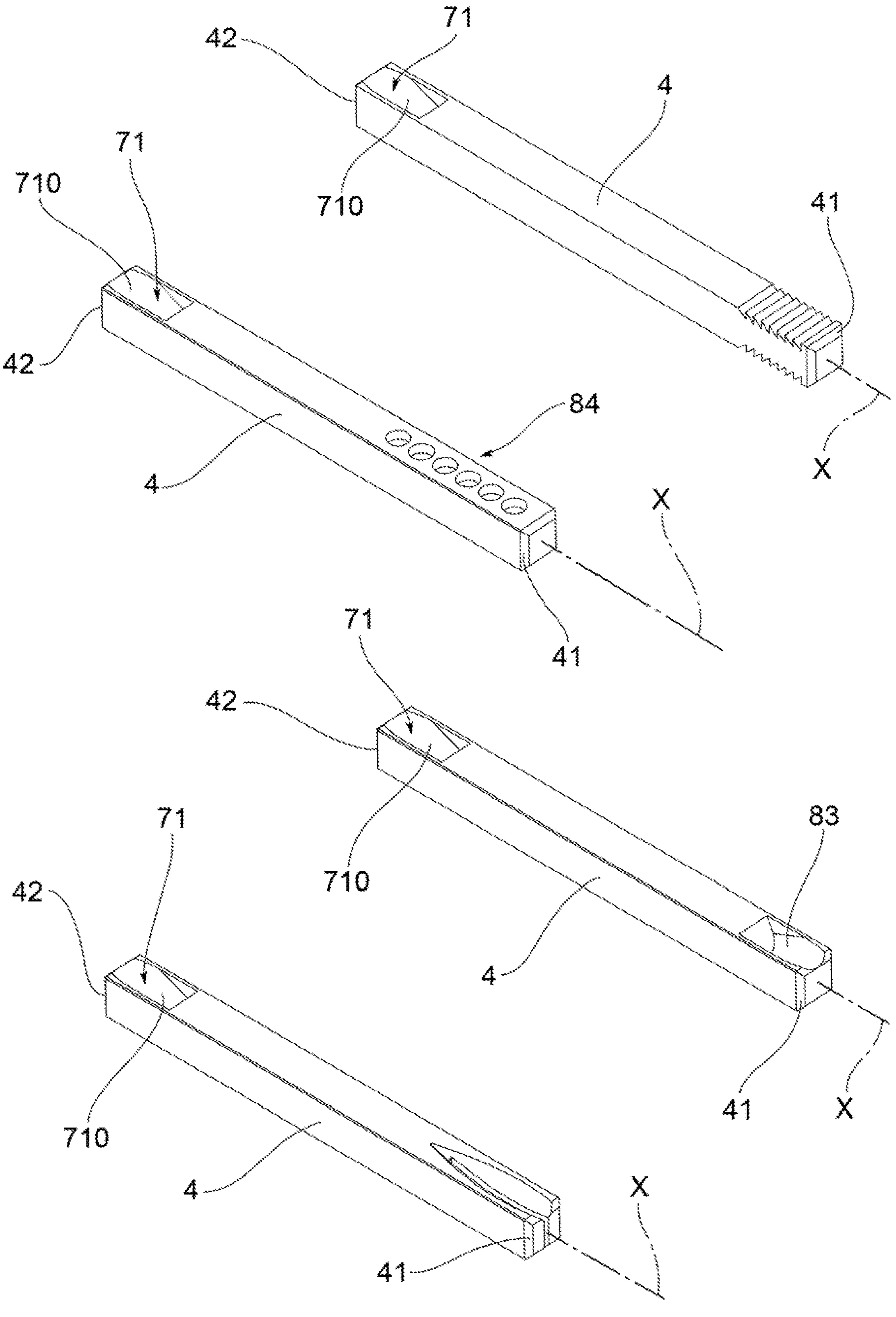
FIG. 8 shows four variant embodiments of a pin element according to the present invention.

As an alternative to the notched region 8, the pin element 4 may comprise a region wherein are made the seats 84 arranged along the axial direction X spaced apart (FIG. 8) so that an interfering element may interfere individually in each seat during the insertion of the pin element 4 into the second element 3 or the handle 2.

According to a variant embodiment, the method for installing the handle assembly 1 comprises the steps of:

a) inserting a pin element 4 in a through-hole 100 of the door or window 10 and securing the pin element 4 in a handle 2 on one side 11 of the door or window 10;

b) inserting the pin element 4 protruding from the hole 100 on the opposite side 12 of the door or window 10 in a second element 3, e.g. a second handle, performing an axial movement of approach between the handle 2 and the second element 3 until the door or to window 10 is encountered;

c) actuating clamping devices to reach a configuration of the handle assembly 1 that maintains an axial pressure of the handle 2 and of the second element 3 on the respective side of the door or window 11, 12.

Preferably, the step of actuating the clamping devices provides for actuating a first interfering element 7 so as to generate an additional approach between the handle 2 and the second element 3 resulting in an intensity increase of the axial pressure of the second element 3 and of the handle 2 on the sides 11, 12 of the door or window.

Preferably, the axial force resulting between the handle 2 and a side 11 of the door or window and between the second element 3 and the opposite side 12 of the door or window, due to the clamping by the clamping devices, is at least equal to 1000 N.

Even more preferably it is between 2000 N and 7000 N, for example between 2000 N and 5000 N.

The force value higher than 1000 N allows an adequate stability of the handle assembly to be obtained both in the axial and in the radial direction, avoiding unpleasant movements of the handle in the radial direction.

Preferably, the step of actuating the interfering element 7 consists in rotating the interfering element (a grub screw) so as to make the end of the interfering element translate on the inclined surface 71 obtained on the pin element 4, generating a relative movement of the pin element with respect to the handle 2 and, thus, an approach between the handle 2 and the second element 3.

Innovatively, the handle assembly according to the present invention allows an extremely simple and quick installation of the assembly on the door or window without the need for specialized personnel or special equipment. Synergistically, moreover, the handle assembly of the present invention allows one to obtain a door or window with a handle without a backplate, making the design of the door or window extremely clean and linear.

For example, when the handle assembly 1 is installed on the door or window, the result is a single inner chamber 300, defined by the hole 100 made in the door or window and by the clamping chambers 22 and 32, each made on the handle 2 and on the second element 3 respectively. In said inner chamber 300, the pin element 4, the friction reducing groups 5,6 (bearings), and the clamping devices 8, 9, 71, 82 are totally contained. In this way, the complete linearity and aesthetic cleanness of the handle assembly on the door or window is guaranteed.

Moreover, advantageously, the handle assembly of the present invention allows the handles to be changed in an extremely rapid and versatile way, since no screws are inserted in the door or window for clamping the backplate. Therefore, when the handle assembly is removed from the door or window for the replacement thereof, there is no trace of holes for fastening the backplate, typical of handle assemblies of the prior art.

In the prior art, all the handles provide for at least one backplate element which, fastened to the door by means of screws, constitutes the support of the handle. Such backplate element may be a washer or a plate; it may have even very small dimensions, but always constitutes the sustaining and support element of the handle. On the contrary, in the present invention, due to the axial clamping action, the handle assembly is self-supporting, not requiring the presence of a backplate or any other means for fastening it to the door to support the handle. The handle is itself a support and fastening element for a possible backplate.

Moreover, the ball bearings, which generate extremely low friction, allow the axial load acting between the handle and the second element (or between two handles) to be supported and at the same time ensure the correct and smooth rotation of the handle. In this way, the return of the handles to the rest position is also guaranteed, even for relatively heavy handles. Furthermore, the distribution of the axial load also in the radial direction, ensures greater stability and robustness of the handle assembly to stresses transverse to the axial direction.

It is clear that one skilled in the art, in order to meet specific needs, may make changes to the invention described above, without departing from the scope of protection as described and claimed herein.

The invention claimed is:

1. A handle assembly for a door or window having a defined thickness, the handle assembly comprising a handle suitable for installation on one side of the door or window and a second element suitable to be mounted on an opposite side of the door or window;

a pin element having a main extension along a pin rotation axis (X) and suitable to penetrate the door or window in a hole in the door or window, said pin element comprising a left end and a right end, each end being insertable in the handle or in the second element a variable depth, said pin element being rotatable around the pin rotation axis (X) upon force exerted on the handle;

a friction reducing group configured to reduce friction generated by a rotating movement of the handle, said friction reducing group being coaxially arranged on the pin element and positioned between the handle and the door or window in an axial direction of the pin rotation axis (X);

clamping devices configured to constrain the handle and/or the second element on the pin element at adjustable distances along the axial direction according to the thickness of the door or window, so that when the handle assembly is installed on the door or window, an axial clamping pressure of the handle and of the second element is maintained on a respective side of the door or window;

wherein said handle assembly is self-supporting;

wherein the handle and/or the second element comprise an axial body extending along a direction perpendicular to a side of the door or window when the handle assembly is installed on the door or window, the axial body including a clamping chamber containing at least partially the friction reducing group and the clamping devices;

wherein said friction reducing group comprises an oblique contact ball bearing and an annular member associated with each of the handle and the second element;

wherein the oblique contact ball bearing transfers a first portion of the axial clamping pressure in the axial direction to the annular element to secure the annular element upon the door or window;

wherein the oblique contact ball bearing transfers a second portion of the axial clamping pressure in a radial direction perpendicular to the axial direction;

wherein the annular member comprises an outer surface upon which the oblique contact ball bearing engages and bears there against, and an opposite inner surface which is disposed upon an outer surface of the door; and wherein the handle assembly only contacts the door where the inner surface of the annular member is said disposed on the outer surface of the door.

2. The handle assembly of claim 1, wherein a ball bearing ball chamber is at least partially or entirely accommodated in the axial body.

3. The handle assembly of claim 1, wherein the clamping devices comprise an interfering element suitable to mechanically interfere with the pin element, said interfering element being actuatable by an operator so as to adjust axial pressure of the handle and/or of the second element on the respective side of the door or window when the handle assembly is installed on the door or window.

4. The handle assembly of claim 3, wherein the clamping devices comprise at least one first protuberance or recess made on the pin element wherein said interfering element engages.

5. The handle assembly of claim 4, wherein the interfering element is a threaded pin movable along a perpendicular direction (Y) in the axial direction, and wherein the recess comprises at least one inclined surface on which engages an end of the threaded pin so that movement of the pin along said perpendicular direction corresponds to a sliding of the pin on the at least one inclined surface and to a change in the axial clamping pressure.

6. The handle assembly of claim 4, wherein the clamping devices comprise at least one second protuberance or recess made on the pin element on an opposite side of the at least one first protuberance or recess, towards the end of the pin element farthest from the at least one first protuberance or recess, and a second interfering element with said at least one second protuberance or recess.

7. The handle assembly of claim 6, wherein the second interfering element is a pin or a retaining plate contained inside the clamping chamber and integrally connected to the handle or to the second element or to the friction reducing group.

8. The handle assembly of claim 1, wherein the handle assembly comprises an elastic element suitable to generate an elastic thrust force in the axial direction (X), said elastic element being contained in the clamping chamber.

9. The handle assembly of claim 1, further comprising a washer disposed to engage the friction reducing group on one face of the washer and further disposed to engage the door or window on an opposite face of the washer at the hole obtained in the door or window.

10. A door or window assembly comprising a door or window and the handle assembly of claim 1 installed on the door or window, wherein the handle assembly installed on the door or window is without a backplate.

11. A method for installing a handle assembly on a door or window having a defined thickness, said handle assembly comprising: a handle suitable for installation on one side of the door or window and a second element suitable to be mounted on an opposite side of the door or window;

a pin element having a main extension along a pin rotation axis (X) and suitable to penetrate the door or window in a hole obtained in the door or window, said pin element comprising a left end and a right end, each end being insertable in the handle or in the second element at a variable depth, said pin element being rotatable around the pin rotation axis (X) upon force exerted on the handle;

a friction reducing group configured to reduce friction generated by a rotating movement of the handle, said friction reducing group being suitable to be coaxially arranged on the pin element and to be positioned at least between the handle and the door or window in an axial direction of the pin rotation axis (X);

clamping devices configured to constrain the handle and/or the second element on the pin element at adjustable distances along the axial direction (X) according to the thickness of the door or window, so that when the handle assembly is installed on the door or window, an axial clamping pressure of the handle and of the second element is maintained on a respective side of the door or window, wherein said handle assembly is self-supporting, and wherein the handle and/or the second element comprise an axial body extending along a direction perpendicular to a side of the door or window when the handle assembly is installed on the door or window, a clamping chamber obtained in said axial body suitable to accommodate at least partially or entirely the friction reducing group and the clamping devices, said friction reducing group comprising an oblique contact ball bearing and an annular member associated with each of the handle and the second element, wherein the annular member comprises an outer surface upon which the oblique contact ball bearing engages and bears there against, and an opposite inner surface which is disposed upon an outer surface of the door; and wherein the handle assembly only contacts the door where the inner surface of the annular member is said disposed on the outer surface of the door the method comprising the steps of:

a) providing the handle wherein the pin element is fastened to and is thereby protruding from the handle, b) inserting the protruding pin element in a through-hole in the door or window on one side thereof;

c) inserting the pin element protruding from the hole on an opposite side of the door or window in a second element, performing an axial movement of approach between the handle and the second element until the door or window is encountered;

d) actuating the clamping devices to reach a configuration of the handle assembly suitable to maintain an axial pressure of the handle and of the second element on the respective side of the door or window, e) wherein actuating the clamping devices involves actuating a first interfering element with the pin element as to generate an additional approach between the handle and the second element resulting in an intensity increase of the axial pressure of the second element and of the handle on the sides of the door or window, wherein step c) provides for engaging a second interfering element with a notched region during the axial movement of approach until a stable configuration of the interfering element on the notched region is reached, transferring a first portion of the axial clamping pressure in the axial direction from the oblique contact ball bearing to the annular element to secure the annular member upon the door or window; and transferring a second portion of the axial clamping pressure from the oblique contact ball bearing in a radial direction perpendicular to the axial direction.

12. The method of claim 11, wherein intensity increase of the axial pressure generating an axial force of at least 1000 N between the second element and the handle with the sides of the door or window.

13. A method for installing a handle assembly on a door or window having a defined thickness, said handle assembly comprising:

a handle suitable for installation on one side of the door or window and a second element suitable to be mounted on an opposite side of the door or window;

a pin element having a main extension along a pin rotation axis (X) and suitable to penetrate the door or window in a hole obtained in the door or window, said pin element comprising a left end and a right end, each end being insertable in the handle or in the second element at a variable depth, said pin element being rotatable around the pin rotation axis (X) upon force exerted on the handle;

a friction reducing group configured to reduce friction generated by a rotating movement of the handle, said friction reducing group being suitable to be coaxially arranged on the pin element and to be positioned at least between the handle and the door or window in an axial direction of the pin rotation axis (X);

clamping devices configured to constrain the handle and/or the second element on the pin element at adjustable distances along the axial direction (X) according to the thickness of the door or window, so that when the handle assembly is installed on the door or window, an axial clamping pressure of the handle and of the second element is maintained on the respective side of the door or window, wherein said friction reducing group comprises an oblique contact ball bearing and an annular member associated with each of the handle and the second element;

wherein the oblique contact ball bearing transfers a first portion of the axial clamping pressure in the axial direction to the annular element to secure the annular element upon the door or window;

wherein the oblique contact ball bearing transfers a second portion of the axial clamping pressure in a radial direction perpendicular to the axial direction;

wherein the annular member comprises an outer surface upon which the oblique contact ball bearing engages and bears there against, and an opposite inner surface which is disposed upon an outer surface of the door; and wherein the handle assembly only contacts the door where the inner surface of the annular member is said disposed on the outer surface of the door, the method comprising the steps of:

a) inserting the pin element in a through-hole of the door or window and securing the pin element to a handle on one side of the door or window;

b) inserting the pin element protruding from the hole on the opposite side of the door or window into a second element, by an axial movement of approach between the handle and the second element until the door or window is encountered;

c) actuating the clamping devices to reach a configuration of the handle assembly that maintains an axial pressure of the handle and of the second element on the respective side of the door or window, said axial pressure generating an axial force of at least 1000 N between the second element and the handle with the sides of the door or window.

14. The method of claim 13, wherein actuating the clamping devices involves actuating a first interfering element with the pin element so as to generate an additional approach between the handle and the second element resulting in an intensity increase of the axial pressure of the second element and of the handle on the sides of the door or window.

* * * * *